United States Patent
Lanka et al.

(10) Patent No.: US 11,825,189 B2
(45) Date of Patent: Nov. 21, 2023

(54) PHOTOGRAPHY ASSISTANCE FOR MOBILE DEVICES

(71) Applicant: QUALCOMM Incorporated, San Diego, CA (US)

(72) Inventors: Venkata Mahesh Lanka, Hyderabad (IN); Santhosh Kumar Behara, Hyderabad (IN); Akash Kumar, Hyderabad (IN); Ghouse Pasha Mohammed, Hyderabad (IN); Ankita, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/023,114

(22) Filed: Sep. 16, 2020

(65) Prior Publication Data
US 2020/0412943 A1    Dec. 31, 2020

Related U.S. Application Data

(63) Continuation of application No. 16/264,969, filed on Feb. 1, 2019, now Pat. No. 10,785,406.

(51) Int. Cl.
*H04N 23/60* (2023.01)
*H04W 4/024* (2018.01)
(Continued)

(52) U.S. Cl.
CPC .............. *H04N 23/64* (2023.01); *G06F 9/453* (2018.02); *G06F 16/5866* (2019.01);
(Continued)

(58) Field of Classification Search
CPC ......... H04N 5/23222; H04N 5/232939; H04N 5/232935; H04N 5/23216; H04N 5/23299;
(Continued)

(56) References Cited

U.S. PATENT DOCUMENTS

| | | | |
|---|---|---|---|
| 9,509,867 B2* | 11/2016 | Camp, Jr. | .......... H04N 1/00307 |
| 2001/0048815 A1 | 12/2001 | Nakajima et al. | |
| 2007/0030363 A1 | 2/2007 | Cheatle et al. | |
| 2009/0231441 A1* | 9/2009 | Walker | .................... G06F 16/58 |
| | | | 348/207.1 |
| 2010/0245596 A1 | 9/2010 | Tirpak et al. | |

(Continued)

FOREIGN PATENT DOCUMENTS

| | | |
|---|---|---|
| CN | 103369220 A | 10/2013 |
| CN | 105144696 A | 12/2015 |

(Continued)

OTHER PUBLICATIONS

International Search Report and Written Opinion—PCT/US2020/016231—ISAEPO—dated Apr. 14, 2020.

*Primary Examiner* — Mekonnen D Dagnew
(74) *Attorney, Agent, or Firm* — Thien T. Nguyen

(57) ABSTRACT

Techniques for providing photography assistance include: determining a location of a mobile device; determining one or more object of interest (OOI) based on the location of the mobile device; obtaining a set of photographs associated with the one or more OOI; presenting the set of photographs associated with the OOI on a display of the mobile device; and in response to a selection of at least one photograph from the list of photographs, providing directional guidance via one or more user interface of the mobile device, wherein the directional guidance includes directions to reach a particular location associated with the selected at least one photograph.

27 Claims, 13 Drawing Sheets

(51) Int. Cl.
*G06F 9/451* (2018.01)
*G06F 16/58* (2019.01)
*G06V 20/20* (2022.01)
*G06V 20/30* (2022.01)
*H04N 23/62* (2023.01)
*H04N 23/63* (2023.01)

(52) U.S. Cl.
CPC .............. *G06V 20/20* (2022.01); *G06V 20/30* (2022.01); *H04N 23/62* (2023.01); *H04N 23/632* (2023.01); *H04N 23/633* (2023.01); *H04W 4/024* (2018.02)

(58) Field of Classification Search
CPC ........ H04N 5/232933; H04N 5/23218; H04W 4/024; G06F 9/453; G06F 16/5866; G06K 9/00671; G06K 9/00677
See application file for complete search history.

(56) References Cited

U.S. PATENT DOCUMENTS

| | | | |
|---|---|---|---|
| 2011/0292221 A1* | 12/2011 | Gu | H04N 5/23222 348/207.1 |
| 2011/0317031 A1 | 12/2011 | Honda | |
| 2013/0050507 A1* | 2/2013 | Syed | H04N 1/00137 348/207.1 |
| 2013/0258159 A1 | 10/2013 | Sakane | |
| 2020/0252543 A1 | 8/2020 | Lanka | |

FOREIGN PATENT DOCUMENTS

| | | |
|---|---|---|
| EP | 1168715 A2 | 1/2002 |
| EP | 1725010 A2 | 11/2006 |
| EP | 2993890 A1 | 3/2016 |

* cited by examiner

PHOTOGRAPHY ASSISTANCE FOR MOBILE DEVICES

CLAIM OF PRIORITY UNDER 35 U.S.C. § 120

The present application for patent is a Continuation of patent application Ser. No. 16/264,969 entitled "PHOTOGRAPHY ASSISTANCE FOR MOBILE DEVICES" filed Feb. 1, 2019 pending, and assigned to the assignee hereof and hereby expressly incorporated by reference herein.

BACKGROUND

Wireless communication devices are increasingly popular and increasingly complex. For example, smartphones have increased in the number of features available, and have all but replaced some technologies/devices. For example, as cameras have improved in smartphones, fewer people are buying separate point-and-shoot cameras, instead relying on the smartphone which users typically have with them for planned photographs, and spur-of-the moment snapshots.

With present camera technology in smart devices (such as smartphones), a user can capture pictures with available features and check to see if the picture meets with the user's approval, e.g., is in focus, captured desired content, etc. The availability of digital images has allowed users to take many more photos than with film cameras, and to determine in real time whether the user captured a desired photo, or whether the user wants to re-try a photo.

Users often wish to capture one or more images of an object of interest (OOI) that is appealing to the user upon sight, and/or that is desirable for one or more other reasons, e.g., that the OOI is a historic object, a monument, a tourist attraction (e.g., the Eiffel Tower), or that the OOI is indicative of a place visited (e.g., a front of a theme park such as the Universal Studios globe). There are sometimes viewpoints for particular OOIs, e.g., at national parks, along highways, etc., that provide suggested locations for users to take pictures. Users may rely on chance, watching/following others, and/or tour guides to determine locations and/or angles for taking photos.

SUMMARY

An example of a mobile device includes: one or more transceivers; one or more cameras; a user interface; a memory; and one or more processor communicatively coupled to the one or more transceivers, the one or more cameras, the user interface, and the memory, the one or more processors configured to: obtain a collection of information sets associated with an object of interest to be photographed, each of the information sets including a respective location at which to take a respective photograph of the object of interest with the one or more cameras; select a particular information set of the collection of information sets, the location in the particular information set being a particular location at which to take a particular photograph of the object of interest; and provide user directional guidance through the user interface to direct a user of the mobile device to the particular location.

An example of a method of assisting photography includes: receiving input related to an object of interest to be photographed; obtaining a collection of information sets associated with the object of interest, each of the information sets including a respective location at which to take a respective photograph of the object of interest; selecting a particular information set of the collection of information sets, the location in the particular information set being a particular location at which to take a particular photograph of the object of interest; and providing user directional guidance through a user interface of a mobile device to direct a user of the mobile device to the particular location.

An example system for assisting photography includes: means for receiving input related to an object of interest to be photographed; means for obtaining a collection of information sets associated with the object of interest, each of the information sets including a respective location at which to take a respective photograph of the object of interest; means for selecting a particular information set of the collection of information sets, the location in the particular information set being a particular location at which to take a particular photograph of the object of interest; and means for providing user directional guidance through a user interface of a mobile device to direct a user of the mobile device to the particular location.

An example non-transitory, processor-readable storage medium stores processor-readable instructions for assisting photography to cause one or more processors to: receive input related to an object of interest to be photographed; obtain a collection of information sets associated with the object of interest, each of the information sets including a respective location at which to take a respective photograph of the object of interest; select a particular information set of the collection of information sets, the location in the particular information set being a particular location at which to take a particular photograph of the object of interest; and provide user directional guidance through a user interface of a mobile device to direct a user of the mobile device to the particular location.

DETAILED DESCRIPTION

Figure 1:
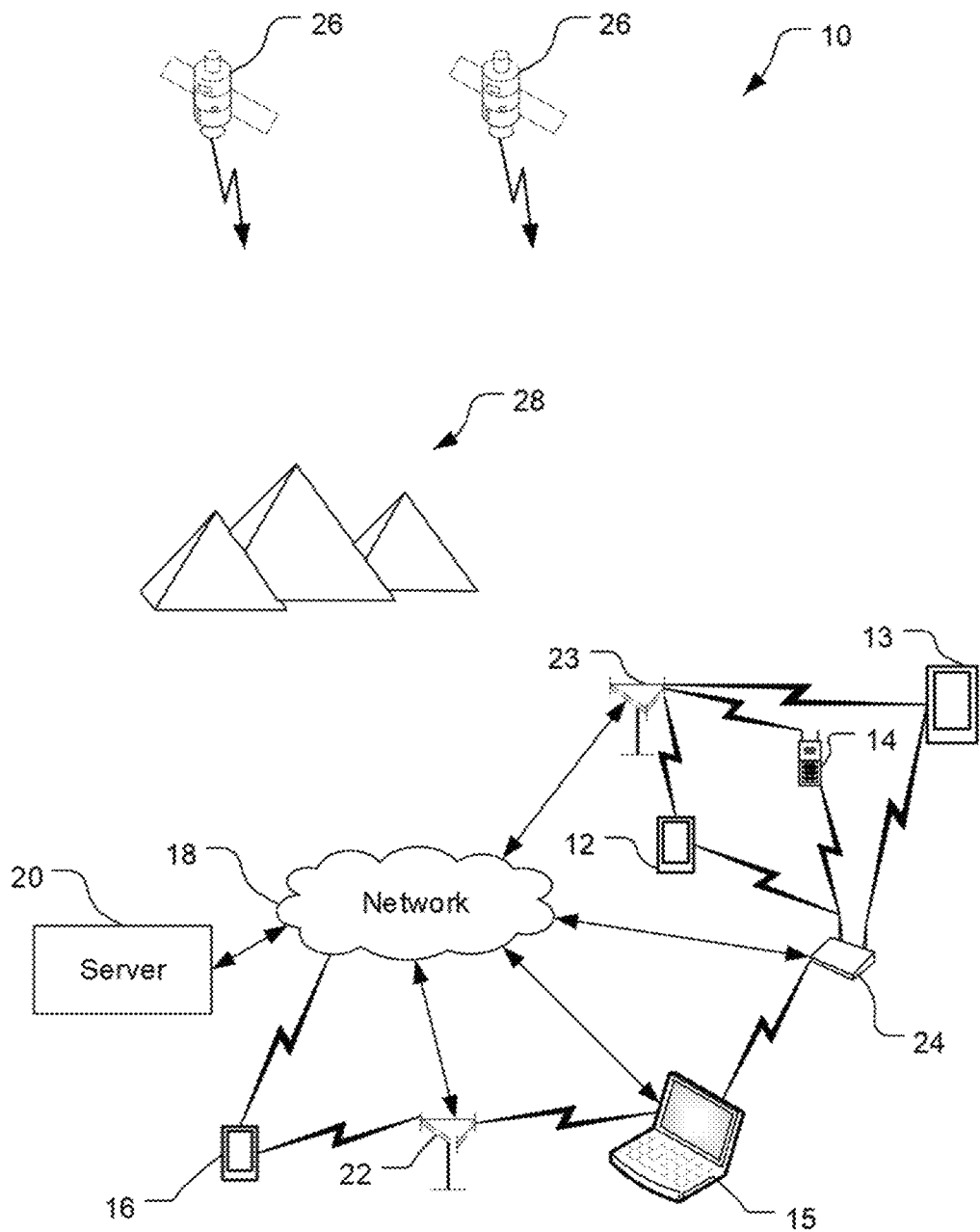
FIG. 1 is a schematic diagram of a communication system.

Camera users often want to take photographs of tourist attractions or other OOIs. Even though with digital photography, users can take numerous photos and determine in real time whether a photo the user took is acceptable and/or whether the user would like to take further photos, users typically want to get the best photo possible. Users may benefit from techniques discussed herein that help users take desirable photos. While cameras, e.g., in smart portable devices, may be able to adjust settings of the camera automatically, users may benefit from different camera settings than the camera would select, and/or may benefit from one or more other suggestions such as a location for a photo, direction of photo, placement of a foreground subject, time of day for a photo, and/or day of the year for a photo, etc.

Techniques are discussed herein for assisting users to take photographs. For example, a smart device can use input regarding an OOI to suggest one or more locations for taking a photograph of the OOI. The device may provide directional guidance to the user through a user interface of the device for the user to follow to arrive at a suggested location. The user may be presented with sample photographs from which the user may choose desired photos to recreate. Based on information associated with the selected photos (e.g., in metadata of the photos), the user may be presented with assistance to take similar photos. For example, the user may be presented with directions to locations for taking the selected photos and/or suggested days and/or times for taking the selected photos. The user's camera settings may be automatically adjusted to recreate the selected photos, e.g., to recreate one or more effects and/or to capture the OOI with similar lighting. For example, a focus point, an ISO (light sensitivity), a flash, a shutter speed, a magnification (zoom), an F-stop (focal length), depth effect, etc. of the user's camera may be set automatically based on information associated with the photos, information regarding the user's camera, present day and/or time, and/or present conditions at the locations corresponding to the photos, etc. Also or alternatively, the user may be presented with positioning information a foreground subject (e.g., a person) in the photo and/or the subject may be presented with the positioning information. Other configurations and/or techniques, however, may be used.

Items and/or techniques described herein may provide one or more of the following capabilities, as well as other capabilities not mentioned. Users may be provided with suggested photograph opportunities. Photographs may be improved, e.g., through the use of camera settings that the user and the user's camera would not have otherwise used. A user's experience may be improved by having the user take photographs that the user would not have thought to capture and/or been able to capture without assistance. A user's experience taking photographs may be improved by directing the user to locations for taking photographs, for example, considering congestion at one or more locations and/or of paths for reaching the locations. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

Referring to FIG. 1, a communication system 10 includes mobile wireless communication devices 12, 13, 14, 15, 16, a network 18, a server 20, base stations 22, 23, an access point (AP) 24, and satellites 26. Mobile wireless communication devices are also referred to herein as mobile devices. While not part of the system 10, the mobile devices 12-16 are disposed in proximity to an OOI 28, here the great pyramids of Egypt. The system 10 is a wireless communication system in that components of the system 10 can communicate with one another (e.g., using wireless connections and/or wired connections) directly or indirectly, e.g., via the network 18, the base station 22, the base station 23, and/or the access point 24 (and/or one or more other devices not shown, such as one or more other base stations and/or one or more other access points). For example, the base station 22 and the devices 15, 16, and the base station 23 and the devices 12-14, may communicate wirelessly using signals according to one or more protocols such as LTE, GSM, CDMA, or OFDM. The single access point 24 and the two base stations 22, 23 are examples only, and other quantities of access points and/or base stations may be used. The term "base station" does not limit the base stations 22, 23 to any particular form, protocol, etc. For example, each of the base stations 22, 23 (and/or other base stations not shown) may be referred to as a base transceiver station (BTS), an access node (AN), a Node B, an evolved Node B (eNB), etc. For indirect communications, the communications may be altered during transmission from one entity to another, e.g., to alter header information of data packets, to change format, etc.

The mobile devices 12-16 shown are mobile wireless communication devices (although they may communicate wirelessly and via wired connections) with the devices 12, 14, 16 being mobile phones (with the devices 12, 16 being smartphones), the device 15 being a laptop computer, and the device 13 being a tablet computer. The types of the devices 12-16 shown are examples and other types of devices may be used (e.g., non-mobile devices such as desktop computers), whether currently existing or developed in the future. Further, other wireless devices (whether mobile or not) may be implemented within the system 10 and may communicate with each other and/or with the mobile devices 12-16, THE network 18, server 20, and/or the AP 24. For example, such other devices may include internet of thing (IoT) devices, medical devices, home entertainment and/or automation devices, etc. The mobile devices 12-16 or other devices may be configured to communicate in different networks and/or for different purposes (e.g., 5G, Wi-Fi communication, multiple frequencies of Wi-Fi communication, satellite positioning, one or more types of cellular communications (e.g., GSM (Global System for Mobiles), CDMA (Code Division Multiple Access), LTE (Long-Term Evolution), etc.). Further, one or more of the devices 12-16 may be configured to receive and process satellite signals from the satellites 26.

Figure 2:
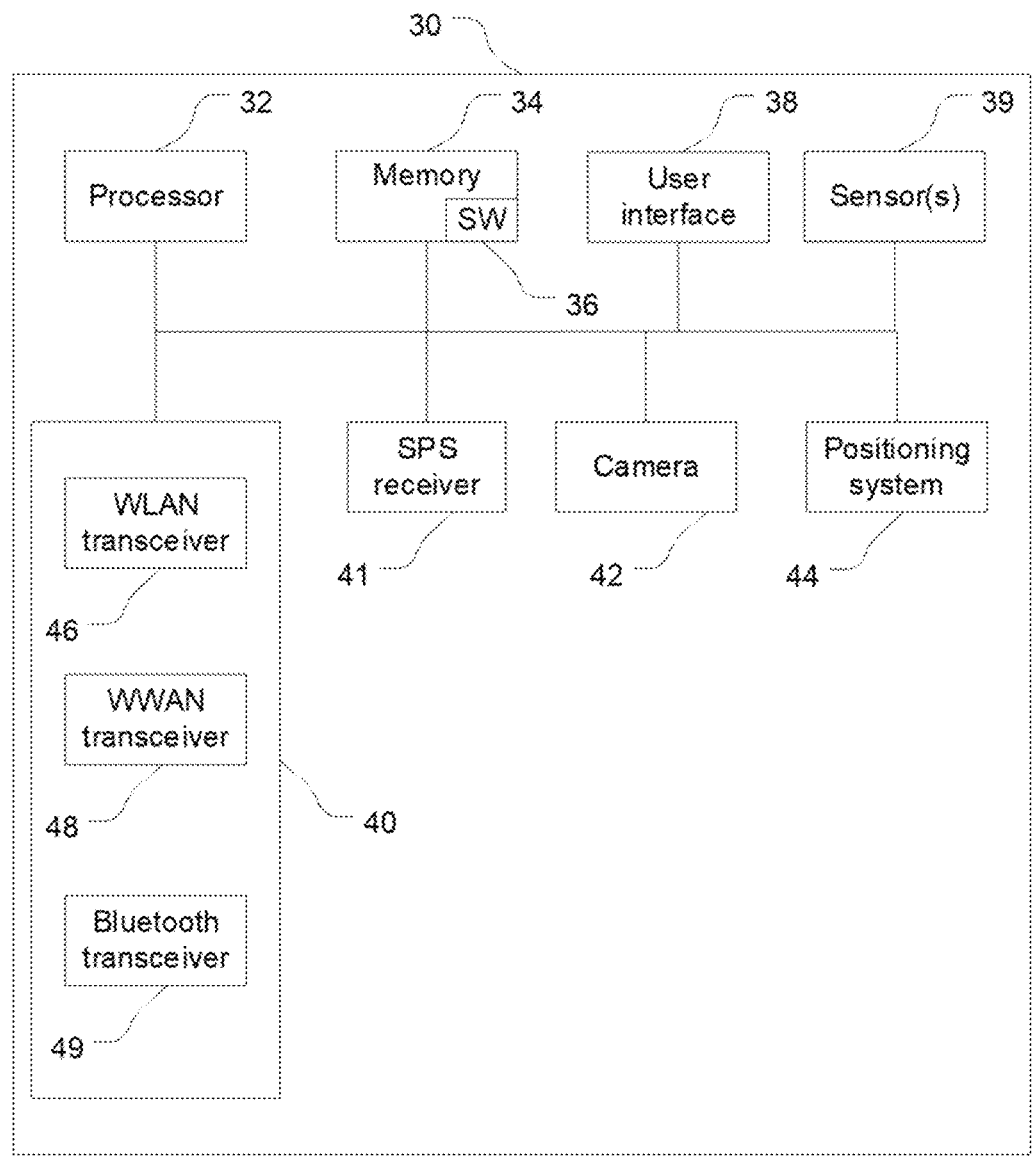
FIG. 2 is a block diagram of components of a communication device shown in FIG. 1.

Referring to FIG. 2, with further reference to FIG. 1, a mobile device 30 is an example of any of the mobile wireless communication devices 12-16 and comprises a computer system including a processor 32, a memory 34 including software (SW) 36, a user interface 38, one or more sensors 39, a transceiver 40, a Satellite Positioning System (SPS) receiver 41, a camera 42, and a positioning system 44. The processor 32 is preferably an intelligent hardware device, for example a central processing unit (CPU) such as those made or designed by QUALCOMM®, ARM®, Intel® Corporation, or AMD®, a microcontroller, an application specific integrated circuit (ASIC), etc. The processor 32 may comprise multiple separate physical entities that can be distributed in the device 30. The memory 34 may include random access memory (RAM) and/or read-only memory (ROM). The memory 34 is a non-transitory, processor-readable storage medium that stores the software 36 which is processor-readable, processor-executable software code containing instructions that are configured to, when performed, cause the processor 32 to perform various functions described herein. The description may refer only to the processor 32 or the device 30 performing the functions, but this includes other implementations such as where the processor 32 executes the software 36 and/or firmware. The software 36 may not be directly executable by the processor 32 and instead may be configured to, for example when compiled and executed, cause the processor 32 to perform the functions. Whether needing compiling or not, the software 36 contains the instructions to cause the processor 32 to perform the functions. The processor 32 is communicatively coupled to the memory 34. The processor 32 in combination with the memory 34, the user interface 38, the transceiver 40, the camera 42, and/or the positioning system 44 provide means for performing functions as described herein. The software 36 may be loaded onto the memory 34 by being downloaded via a network connection, uploaded from a disk, etc. The device 30 may be any of the mobile wireless communication devices 12-16 shown in FIG. 1, or another device. The term "wireless communication device" does not require, as is apparent from the wireless communication devices 12-16, that the functionality of the device be exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

The user interface 38 includes one or more mechanisms for interacting with a user of the device 30. For example, the user interface 38 may include a display for providing visual information to the user. The display may be a touch-sensitive display configured to receive input from the user, e.g., by the user touching the screen to select an application associated with an icon shown on the display, or by the user touching an icon of a letter to enter text, etc. The user interface 38 may also or alternatively include a keyboard (e.g., as with the device 15 shown as being a laptop computer) for input of characters (e.g., text, numbers, etc.). The user interface 38 may also or alternatively include a speaker for providing audible information to the user. The user interface 38 may also or alternatively include a microphone for receiving audio input from the user.

The sensor(s) 39 may include one or more sensors for sensing motion and providing signals indicative of sensed motion. For example, the sensors(s) 39 may include a gyroscope and/or an accelerometer. The sensor(s) 39 may provide output signals, indicative of sensed motion, to one or more other components of the system 30, e.g., to the positioning system 44, to the memory 34, and/or to the processor 32.

The transceiver 40 is configured to communicate with other entities in the system 10. The transceiver 40 may be configured to communicate bi-directionally with the network 18, the base stations 22, 23, and/or the access point 24, using wireless and/or wired communications. For wireless communications, the transceiver 40 may include a Wireless Local Area Network (WLAN) transceiver 46 and/or a Wireless Wide Area Network (WWAN) transceiver 48 and/or a BLUETOOTH® transceiver 49 (or other short-range wireless communication protocol transceiver). The transceivers 46, 48, 49 may include one or more antennas, respectively, for wirelessly sending and/or receiving wireless signals to/from the network 18, the base stations 22, 23, and/or the access point 24. The transceivers 46, 48, 49 are shown as part of the transceiver 40, but any one or combination of the transceivers 46, 48, 49 may be separate from the transceiver 40 (although the disclosure assumes that the transceivers 46, 48, 49 are part of the transceiver 40). The description of the transceiver 40 performing a function applies even if some or all of the function is performed by a component that is physically separate from the transceiver 40. The transceiver 40 is configured to process and send electrical signals, e.g., to one or more antennas for transducing and sending by the one or more antennas as wireless signals. The transceiver 40 is configured to process signals that were wirelessly received and transduced by the one or more antennas and provided to the transceiver 40, and to provide the signals to the appropriate entity/entities in the device 30, e.g., to the processor 32, to the user interface 38, and/or to the positioning system 44, etc.

The SPS receiver 41 is configured to receive and measure signals received from the satellites 26. The SPS receiver 41 may include one or more antennas configured to receive wireless signals from the satellites 26. The SPS receiver 41 may provide indications of the received satellite signals, e.g., indications of measurements of the signals, to the positioning system 44 to be used to determine the location of the device 30. Also or alternatively, the SPS receiver 41 may be configured to determine a location of the mobile device 30.

The camera 42 is configured to capture images and provide information regarding the images to the processor 32 and/or to the memory 34. The camera 42 may be configured to capture still images and or video. While the discussion herein concentrates on still-image photography, the techniques discussed apply, where possible, to video capture as well. The camera 42 may have one or more adjustable settings, e.g., a focus point, an ISO (light sensitivity), a flash, a shutter speed, an F-stop (focal length), depth effect, etc. The camera 42 may be configured to process the images, e.g., to apply a filter to the image, to add special effects (e.g., graphics, distortion of objects in an image), etc. Information regarding the images may be provided to the processor 32 for processing and/or may be provided to the memory 34 for storage, for processing by the processor 32, and/or for transmission by the transceiver to one or more external entities (e.g., the server 20). The information regarding the images may include indications of pixel values, values of camera settings (e.g., shutter speed, etc.), position of the mobile device 30, etc. The camera 42 may include more than one camera, e.g., a forward-facing camera directed away from a front of the mobile device 30 (e.g., on a side of the mobile device with a display) to capture images of objects disposed in view of the front of the mobile device 30, and/or a rear-facing camera disposed on a bottom side of the mobile device 30 and directed to capture images of objects in view of the bottom of the mobile device 30.

The positioning system 44 is configured to determine and provide indications of a position of the mobile device 30. The positioning system 44 may work in conjunction with the SPS receiver 41, e.g., being configured to obtain measurements from the SPS receiver 41 and to process the measurements to determine a position of the mobile device 30. Also or alternatively, the positioning system 44 may be configured to use signals from the base station 22, the base station 23, and/or the access point 24 and/or one or more other entities (e.g., other base stations, other access points, etc.) to determine the position of the mobile device 30. Also or alternatively, the positioning system 44 may be configured to use signals from the camera 42 and apply computer vision (e.g., to one or more still photos and/or one or more video frames) to determine a location of the mobile device 30 and/or an OOI within sight of the mobile device 30. The positioning system 44 may be configured to cause the camera 42 to capture one or more images without input from the user (e.g., intermittently according to a schedule, in response to external stimuli such as moving into range of an access point and receiving a signal from that access point, etc.). The positioning system 44 may be configured to determine information based on multiple positions, e.g., speed and/or direction of the mobile device 30. The positioning system 44 may provide information regarding the position (or speed, or direction, etc.) of the mobile device 30 to the processor 32, to the memory 34, to the user interface 38, and/or to the transceiver 40. The positioning system 44 may be implemented using the processor 32. Also or alternatively, the positioning system 44 may be configured to use signals from the one or more sensors 39 (e.g., gyroscope, accelerometer, etc.) to determine position, e.g., by performing dead reckoning based on motion from a known prior position of the device 30.

Figure 3:
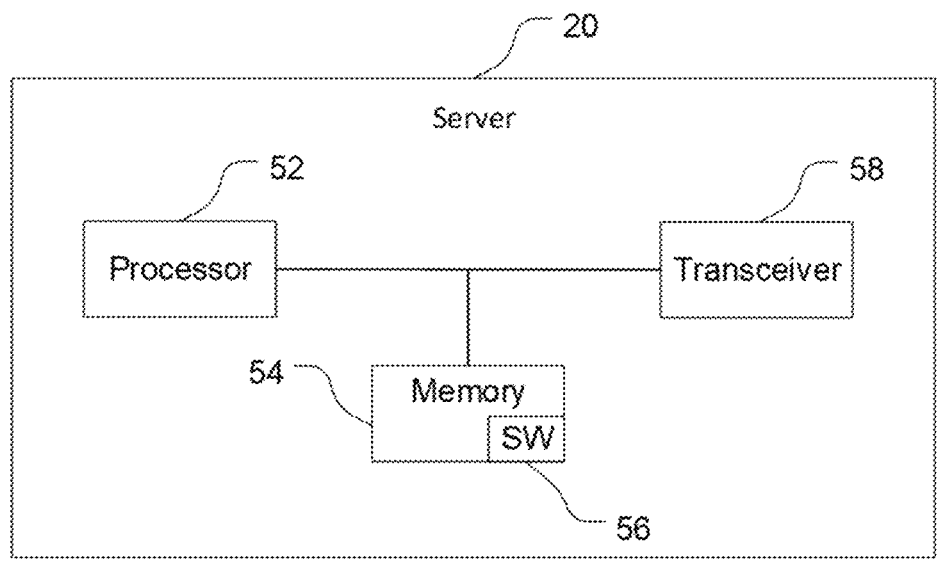
FIG. 3 is a block diagram of components of a server shown in FIG. 1.

Referring to FIG. 3, with further reference to FIG. 1, an example configuration of the server 20 comprises a computer system including a processor 52, a memory 54 including software (SW) 56, and a transceiver 58. The processor 52 is preferably an intelligent hardware device, for example a central processing unit (CPU) such as those made or designed by QUALCOMM®, ARM®, Intel® Corporation, or AMD®, a microcontroller, an application specific integrated circuit (ASIC), etc. The processor 52 may comprise multiple separate physical entities that can be distributed in the server 20. The memory 54 may include random access memory (RAM) and/or read-only memory (ROM). The memory 54 is a non-transitory, processor-readable storage medium that stores the software 56 which is processor-readable, processor-executable software code containing instructions that are configured to, when performed, cause the processor 52 to perform various functions described herein. The description may refer only to the processor 52 or the server 20 performing the functions, but this includes other implementations such as where the processor 52 executes the software 56 and/or firmware. The software 56 may not be directly executable by the processor 52 and instead may be configured to, for example when compiled and executed, cause the processor 52 to perform the functions. Whether needing compiling or not, the software 56 contains the instructions to cause the processor 52 to perform the functions. The processor 52 is communicatively coupled to the memory 54. The processor 52 in combination with the memory 54 and the transceiver 58 provide means for performing functions as described herein. The software 56 may be loaded onto the memory 54 by being downloaded via a network connection, uploaded from a disk, etc. The memory 54 may store libraries of information associated with photographs or possible photographs of OOIs, as discussed further below.

The transceiver 58 is configured to communicate with other entities in the system 10. The transceiver 58 may be configured to communicate bi-directionally with the network 18, the base station 22, the base station 23, and/or the access point 24, etc. The transceiver 58 may include one or more antennas for wirelessly sending and/or receiving wireless signals to/from the network 18, the base station 22, the base station 23, and/or the access point 24, etc. The transceiver 40 is configured to process and send electrical signals to one or more other entities (e.g., the network 18) and/or to the one or more antennas for transducing and sending by the one or more antennas as wireless signals. The transceiver 58 is configured to process signals received from other entities, e.g., from the network 18 and/or that were wirelessly received and transduced by the one or more antennas and provided to the transceiver 58, and to provide the signals to the appropriate entity/entities in the server 20, e.g., to the processor 52.

Figure 4:
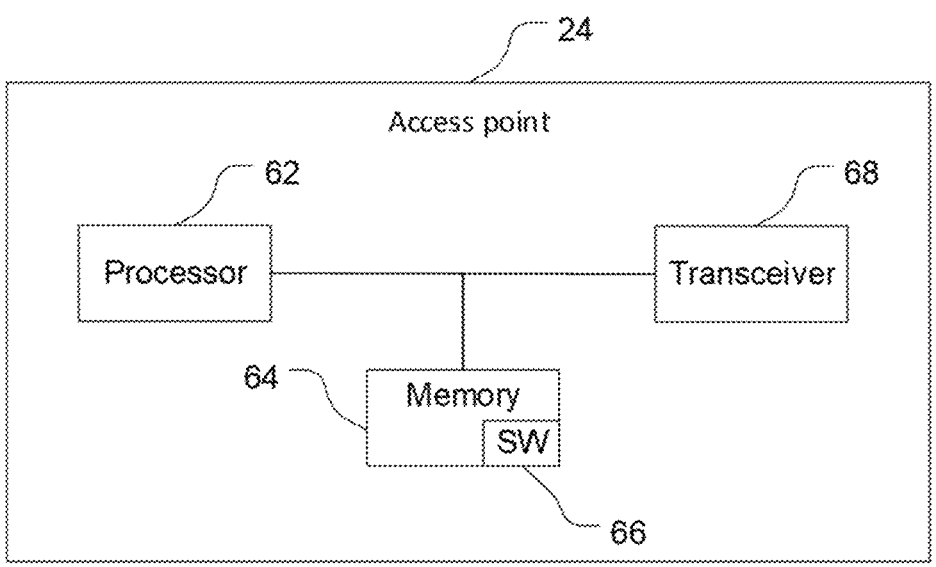
FIG. 4 is a block diagram of components of an access point shown in FIG. 1.

Referring to FIG. 4, with further reference to FIG. 1, an example configuration of the access point 24 comprises a computer system including a processor 62, a memory 64 including software (SW) 66, and a transceiver 68. The processor 62 is preferably an intelligent hardware device, for example a central processing unit (CPU) such as those made or designed by QUALCOMM®, ARM®, Intel® Corporation, or AMD®, a microcontroller, an application specific integrated circuit (ASIC), etc. The processor 62 may comprise multiple separate physical entities that can be distributed in the access point 24. The memory 64 may include random access memory (RAM) and/or read-only memory (ROM). The memory 64 is a non-transitory, processor-readable storage medium that stores the software 66 which is processor-readable, processor-executable software code containing instructions that are configured to, when performed, cause the processor 62 to perform various functions described herein. The description may refer only to the processor 62 or the access point 24 performing the functions, but this includes other implementations such as where the processor 62 executes the software 66 and/or firmware. The software 66 may not be directly executable by the processor 62 and instead may be configured to, for example when compiled and executed, cause the processor 62 to perform the functions. Whether needing compiling or not, the software 66 contains the instructions to cause the processor 62 to perform the functions. The processor 62 is communicatively coupled to the memory 64. The processor 62 in combination with the memory 64 and the transceiver 68 provide means for performing functions as described herein. The software 66 may be loaded onto the memory 64 by being downloaded via a network connection, uploaded from a disk, etc. While FIG. 4 shows the access point 24, the base stations 22, 23 may be configured similarly and thus the discussion with respect to FIG. 4 applies equally to the base stations 22, 23.

The transceiver 68 is configured to communicate with other entities in the system 10. The transceiver 68 may be configured to communicate bi-directionally with the mobile devices 12-16, the network 18, and/or the base stations 22, 23, etc. The transceiver 68 may include one or more antennas for wirelessly sending and/or receiving wireless signals to/from the mobile devices 12-16, the network 18, and/or the base stations 22, 23, etc. The transceiver 68 is configured to process and send electrical signals to one or more other entities (e.g., the network 18) and/or to the one or more antennas for transducing and sending by the one or more antennas as wireless signals. The transceiver 68 is configured to process signals received from other entities, e.g., from the network 18 and/or that were wirelessly received and transduced by the one or more antennas and provided to the transceiver 68, and to provide the signals to the appropriate entity/entities in the access point 24, e.g., to the processor 62.

Figure 5:
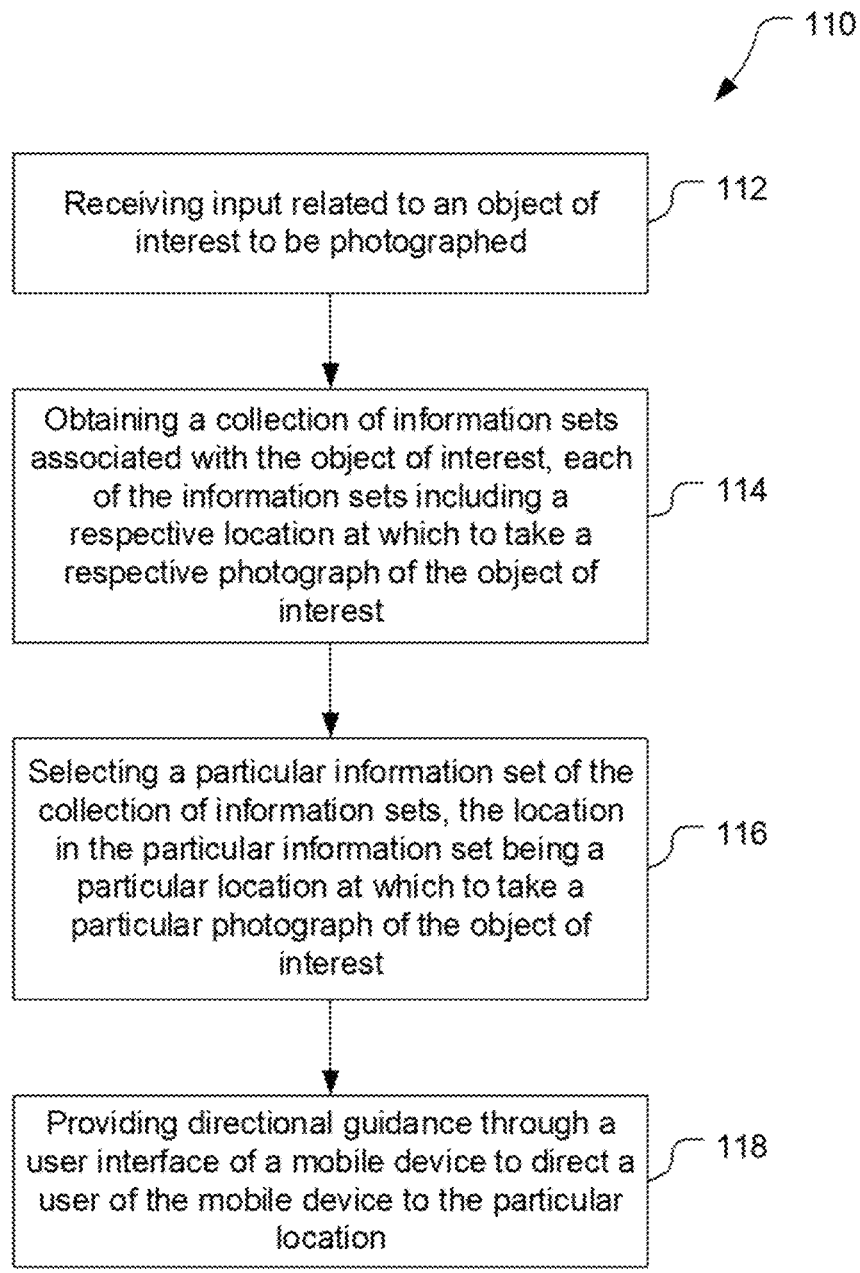
FIG. 5 is a block flow diagram of a method of assisting photography.

Referring to FIG. 5, with further reference to FIGS. 1-4, a method 110 of assisting photography includes the stages shown. The method 110 is, however, an example only and not limiting. The method 110 may be altered, e.g., by having stages added, removed, rearranged, combined, performed concurrently, and/or having single stages split into multiple stages. In the discussion below, reference is often made to the processor 32, and sometimes to one or more of the processors 52, 62, but one or more of the processors 52, 62 may, where possible, be used to implement a function even if only the processor 32 is mentioned.

At stage 112, the method 110 includes receiving input related to an object of interest to be photographed. For example, input may be received from a user through the user interface 38, from the camera 42, or from a communication from the access point 24, the base station 22, and/or the base station 23 to the server 20, etc. The input may be in the form of a request for assistance, an identification of an OOI, a notification of the location of a mobile device, etc. The processor 32 may be configured to receive the input via the user interface 38, e.g., an indication that the user pressed a display of the user interface 38, or entered text via the user interface 38, etc. Non-exhaustive examples of input related to an OOI are discussed below. Means for receiving the input may be provided, for example, by the user interface 38, the transceiver 40, the SPS receiver 41, the camera 42, and the positioning system 44. As another example, means for receiving the input may be provided by the processor 32, the memory 34, the transceiver 40, the processor 52, the memory 54, and the transceiver 58. As another example, means for receiving the input may be provided by the processor 32, the memory 34, the transceiver 40, the processor 62, the memory 64, and the transceiver 68. Still other examples of means for receiving the input are possible.

Figure 6:
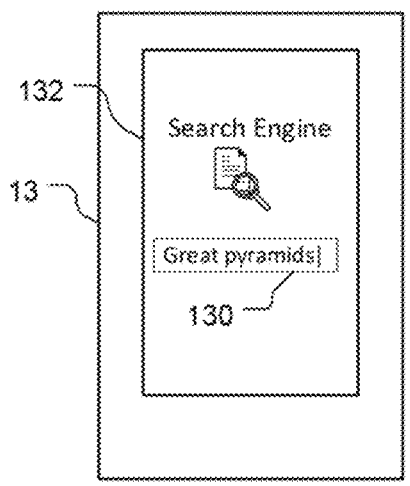
FIGS. 6-10 are examples of user interfaces during input related to an object of interest for photography.
Figure 7:
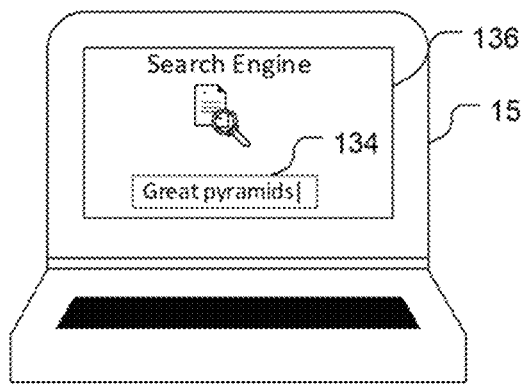

Referring also to FIGS. 6-7, the user may, for example, type a query into a search box 130 of a display 132 of the user interface 38 of the mobile device 13, or into a search box 134 of a display 136 of the user interface 38 of the mobile device 15. While for simplicity the discussion below assumes the use of the mobile device 13, the discussion applies to other mobile devices. The user may enter the search query while near the OOI that is the subject of the query. Alternatively, the user may enter the search while far away from the OOI. For example, the user may enter the search query while home (or elsewhere) before a trip in order to plan places to go and objects to see and possibly photograph. The user may use one of the mobile device 12-16 to enter the query or another device such as a laptop computer.

Figure 8:
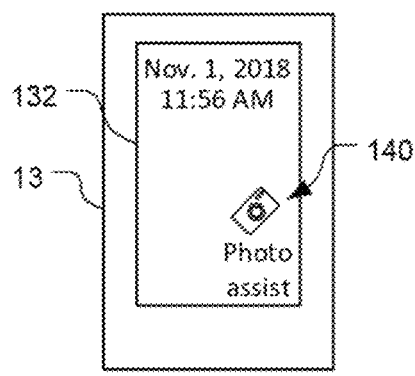
Figure 9:
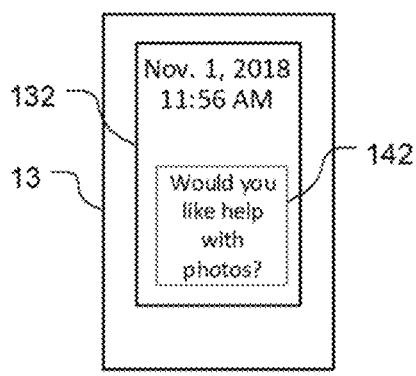

Referring also to FIGS. 8-9, the user may be provided with one or more icons that may be selected to provide the user with assistance. Photo assistance may be provided, for example, by a photo assist application, and the application may be installed in the mobile device 13 during manufacture, or may be a third-party application downloaded (e.g., by the user) after manufacture of the mobile device 13. For example, as shown in FIG. 8, the user may be provided with a photo assist app icon 140 for an application for providing photographic assistance as discussed herein. The icon 140 may be displayed constantly (at least on a resident page, such as a home page, for the icon 140), or the icon 140 may be shown on the display 132 in response to the device 13 moving into proximity, e.g., within a threshold distance (e.g., 100 m, 800 m, 1500 m, ¼ mile, 1 mile, etc.) of an OOI of a base station or access point, or within communication range of a base station or access point (e.g., as indicated by the base station or access point receiving a signal from the device 13), etc. Assistance (e.g., directional guidance for the user and/or a subject, and/or camera settings, etc.) may be provided to the user in response to the user selecting the icon 140, e.g., pressing the display where the icon 140 is shown. As shown in FIG. 9, the user may be provided with a photo assist prompt icon 142 asking the user whether the user would like assistance with photos (or another appropriate prompt) as discussed herein. The icon 142 may be displayed constantly (at least on a resident page, such as a home page, for the icon 142), or the icon 142 may be shown on the display 132 in response to the device 13 moving into proximity of a base station or access point. The icon 142 may be a prompt for the user and may indicate, either before or after selection by the user, that the photo assistance is a paid service (e.g., that the user may pay for via a payment card, or via a communication service subscribed to by the user, etc.). For example, a prompt for paid photo assistance may be provided at one or more tourist spots. Assistance may be provided to the user (e.g., an application launched) in response to the user selecting the icon 142, e.g., pressing the display where the icon 142 is shown. The icon 140 and/or the icon 142 may prompt the user regarding one or more OOIs that are proximate to the user's location, e.g., with the icon 142 reading "Would you like help with photos of the Great Pyramids?" or something similar instead of a generic inquiry regarding photos generally (e.g., as shown in FIG. 9).

Figure 10:
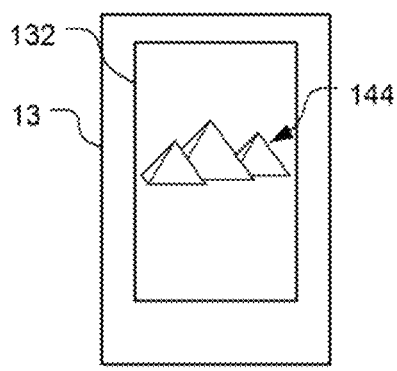

Referring also to FIG. 10, input regarding an OOI may be provided automatically by the camera 42. The camera 42 may be automatically triggered, e.g., intermittently, in response to moving into a new area, in response to seeing a new access point or base station (i.e., a change in a neighbor list even if the "new" neighbor has been seen before), etc. One or more images, such as an image 144, captured by the camera 42 may be analyzed, e.g., by applying computer vision techniques, to determine whether an OOI may be proximate to the user. For example, the image 144 may be analyzed (e.g., by the processor 32, the processor 52, and/or the processor 62, to determine location of the device 13 and the location used to determine whether an OOI is within a threshold distance. Also or alternatively, the image 144 may be determined to of an OOI itself. The OOI and/or the location may be determined, for example, by identifying the OOI and/or one or more other objects such as street signs, buildings, billboards, etc. and using known locations for those objects to determine the location of the mobile device 12-16.

The input regarding the OOI may be received by the server 20, the base station 22, the base station 23, and/or the access point 24. For example, indications of input discussed with respect to FIGS. 6-9 may be sent by the device 13 to the server 20, the base stations 22, 23, and/or the access point 24. Indeed, the input may not be received by the mobile device 12-16, e.g., if the input is a signal received from the mobile device 12-16 by the base station 22, the base station 23, and/or the access point 24. In this case, the input may be the received signal, which provides an estimated location of the mobile device 12-16, which may be used (e.g., by the server 20, the base station 22, the base station 23, and/or the access point 24) to determine an OOI that the user may wish to photograph (e.g., that is within a threshold distance of the mobile device 12-16). As another example, the mobile device 12-16 may send an indication of the location (which may be referred to herein as simply the location) of the mobile device 12-16 and the server 20, the base station 22, the base station 23, and/or the access point 24 may receive this indication and relate the location to an OOI. The indication of the location may be sent by the mobile device 12-16 intermittently (e.g., in response to a timer expiring), in response to the mobile device 12-16 seeing a new neighbor (e.g., the base station 22, the base station 23, and/or the access point 24), in response to user input via the user interface 38, in response to a request from one or more other entities (e.g., the server 20, the base station 22, the base station 23, and/or the access point 24). A location of the mobile device 12-16, whether determined by the positioning system 44 or otherwise (e.g., by being entered by the user), may be used to determine possible OOIs, e.g., those OOIs within a threshold distance of the mobile device 12-16 (e.g., a default threshold distance, a threshold distance entered by the user, etc.).

Figure 11:
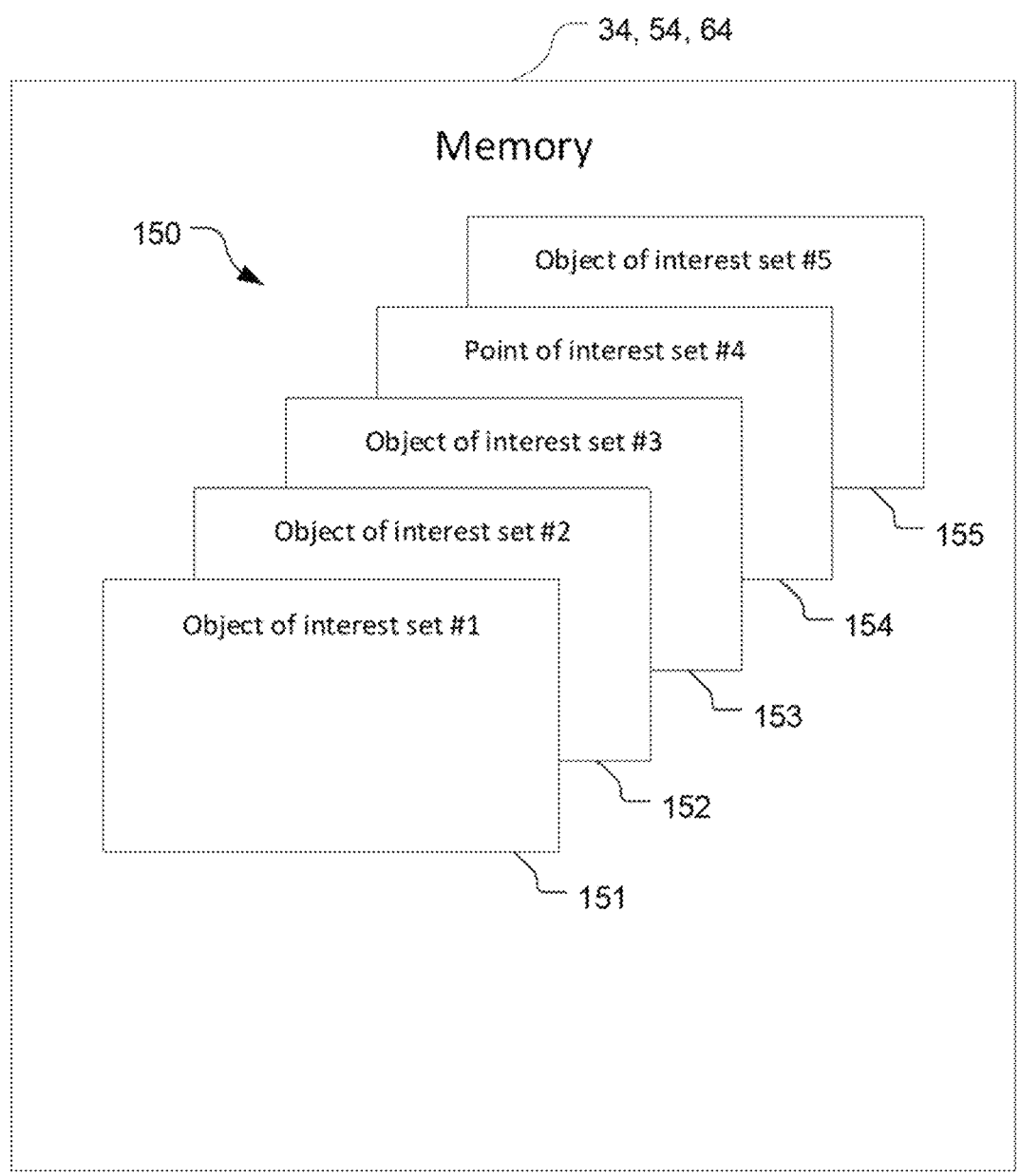
FIG. 11 is a simplified block diagram of a memory storing a collection of information sets for objects of interest.

Returning to FIG. 5, with further reference to FIGS. 1-4, and 6-10, at stage 114, the method 110 includes obtaining a collection of information sets associated with the object of interest, each of the information sets including a respective location at which to take a respective photograph of the object of interest. For example, referring also to FIG. 11, the processor 32, the processor 52, and/or the processor 62 may access the memory 34, the memory 54, and/or the memory 64 to access a collection 150 of sets 151, 152, 153, 154, 155 of information corresponding to objects of interest. Alternatively, the collection 150 may be received by the processor via the transceiver 40. In this example, there are five sets 151-155 of information corresponding to objects of interest #1-#5, respectively. This is an example only, and other quantities of sets of information may be stored in the memory 34, 54, and/or 64. The objects of interest in the sets 151-155 may be the same OOI or two or more OOI's. The collection 150, or at least the information sets of the information sets 151-155 corresponding to the OOI of the input, are obtained from the memory 34, 54, 64 and or another source such as a cloud-based storage. Indeed, in the example of the mobile device 13, the memory 54 of the server 20 may be considered to be cloud-based storage as the server 20 is accessible by the mobile device 13 via the network 18. The mobile device (e.g., the processor 32) may filter images from the cloud (or other source) using metadata associated with the images and based on one or more criteria (e.g., present location, present weather, present time of day, present day of week, present day of year, and/or present year, etc.). Means for obtaining the collection of information sets may be provided, for example, by the processor 32 and the memory 34. As another example, means for obtaining the collection of information sets may be provided by the processor 32, the memory 34, the transceiver 40, the processor 52, the memory 54, and the transceiver 58. As another example, means for obtaining the collection of information sets may be provided by the processor 32, the memory 34, the transceiver 40, the processor 62, the memory 64, and the transceiver 68.

Figure 12A:
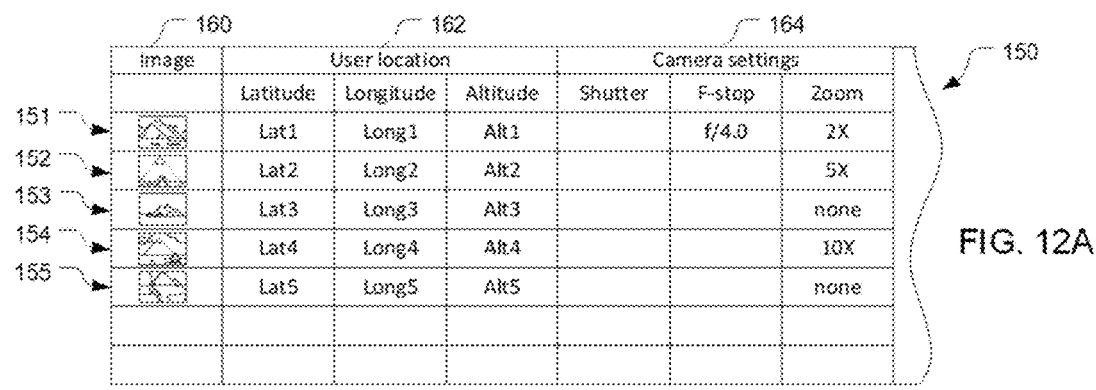
FIGS. 12A and 12B are simplified diagrams of respective portions of the collection shown in FIG. 11.
Figure 12B:
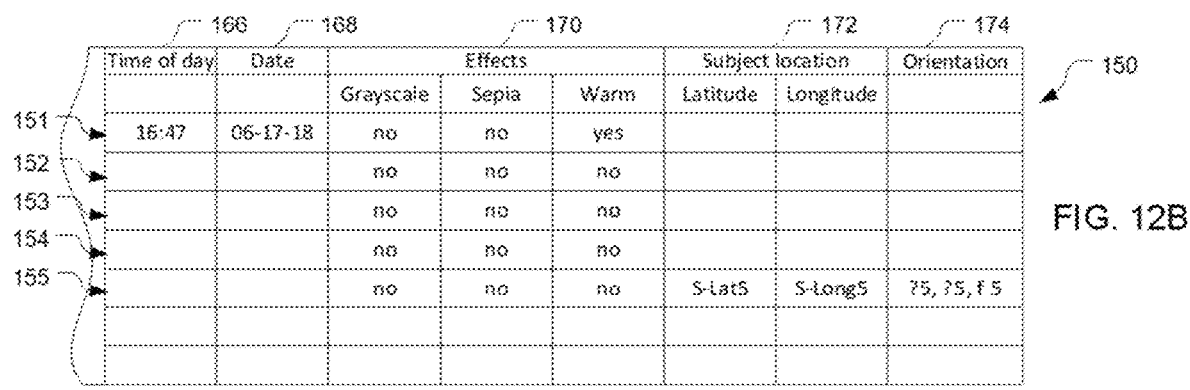

Referring also to FIGS. 12A and 12B, each of the information sets 151-155 in the collection 150 (a respective portion of which is shown in each of FIGS. 12A and 12B) may include information for one or more of several categories. Here, for example, the categories include an image 160, a user location 162, camera settings 164, a time of day 166, a date 168 (from which the day of the year can be determined), image/camera effects 170, a subject location 172, and a subject orientation 174. The values of the categories may be kept in metadata associated with the images 160. Some sets of information may not include values for all of the categories or subsets of values for one or more of the categories. The images 160 show possible photographs from various angles and/or perspectives and/or distances and/or using various camera settings and/or image/camera effects. The user locations 162 may include, e.g., latitude, longitude, and altitude values. The user locations 162 may include orientation of the camera, i.e., a direction in which to point the camera 42, when at the user location in order to capture the corresponding image 160. These location values may correspond to the location values of a camera that took the image 160 and/or may be suggested values for taking the corresponding image 160. The altitude values may correspond to altitude above sea level or altitude above ground level at the corresponding latitude and longitude were altitude relative to another reference point. The location values may correspond to designated points for taking photos, e.g., vistas or viewpoints that may include markers indicating good locations for taking photos. The camera settings 164 include values of various adjustable camera settings such as, for example, shutter speed, F-stop, and a zoom (magnification value), although different values may be included in the information sets 151-155. The effects 170 may include one or more values for one or more corresponding subcategories of information for effects that may be applied to the camera 42 and/or the captured image. For example, effects may include a color capture effect such as grayscale, of filters such as sepia, or a "warm" filter. The subject location 172 may include latitude and/or longitude values (and may include altitude, although not shown) for a subject to be placed in the foreground of the image 160 with the OOI in the background of the image 160. For example, the information set 155 includes values for the subject location 172 and subject orientation 174 as there is a subject (here, a person) in a foreground of the image 160 in the information set 155. The subject location 172 information may be used to position the subject, e.g., in a location of a subject in an image to be recreated, and the orientation 174 information may be used to orient the subject, e.g., to face a desired direction to recreate the image. Here, the subject orientation 174 is provided in spherical coordinates, i.e., values of $\rho$, $\theta$, and $\varphi$, but other orientation values may be used. Also or alternatively, user and subject location and orientation may be provided in relative terms, e.g., distance of the subject from the user and in what direction, orientation of the subject relative to the user and/or relative to an object such as the OOI or another object.

Values of the categories 162, 164, 170, 172 may be values that will help the camera 42 re-create the image 160 for the corresponding information set 151-155. Values stored in the various information sets may correspond to actual values used to capture the image 160 and the respective information set, or maybe suggested values such as values determined to best capture an image at a particular location, at a particular time of day, and/or a particular time of year. The information in the collection 150 may be used to provide assistance to the user in taking a photograph, e.g., to set camera settings to values indicated in a selected information set, to set camera settings based on (e.g., by extrapolation or interpolation) values indicated in a selected information set, to direct a user to a location for taking a photograph, to direct the location of a foreground subject for the photograph, etc., as discussed further below.

The categories provided in FIGS. 12A and 12B are examples only and not limiting. One or more of the categories may be omitted and/or one or more other categories may be included. For example, other categories may include exposure time, an exposure program, compressed bits per pixel, an exposure bias, an aperture value (e.g., a maximum aperture value), a metering mode, flash (whether a flash was used), numbers of pixels in horizontal and vertical dimensions of the image, a latitude reference, a longitude reference, an altitude reference (e.g., sea level), or an image direction (camera orientation). Still other categories may be used.

The collection 150 of information sets may be stored at one or more of a variety of locations. For example, the collection 150 may be stored in the memory 54 of the server 20, in the memory 64 of the access point 24, and/or in the memory 34 of the mobile device 12-16. As an example, the access point 24 may be disposed at an amusement park and may store a collection of information sets corresponding to various OOI's at the amusement park. The access point 24 may download the collection 150 to any of the mobile devices 12-16 that come within communication range of the access point. As another example, the server 20 may download a collection of information sets corresponding to one of the mobile devices 12-16 via an access point with which the mobile device 12-16 comes into communication range and with which the collection of information sets is associated, e.g., due to the location of the access point and one or more corresponding OOI's of the collection of information sets. As yet another example, less than all of the information in the collection 150 may be downloaded to the mobile device 12-16. For example, the images in the image category 160 of the information sets 151-155 may be downloaded to the mobile device 12-16 without downloading, at least initially, other information of the information sets 151-155.

One or more of the information sets 151-155 may include subsets of information. For example, an information set may include multiple images 160 corresponding to one location but different camera orientations 174.

Returning to FIG. 5, with further reference to FIGS. 1-4, and 6-12, at stage 116, the method 110 includes selecting a particular information set of the collection of information sets, the location in the particular information set being a particular location at which to take a particular photograph of the object of interest. The selecting may be of the particular information set as a whole, or by selecting any portion of the particular information set. The selecting may be done by the user, e.g., based on a location, a popularity of an image, proximity to a present location, accessibility of one or more locations of one or more corresponding information sets, etc. The selecting may be done by the processor 32, 52, and/or 62, e.g., based on popularity of an image, proximity to a present location, accessibility of one or more locations of one or more corresponding information sets, time of day, day of year, weather conditions, etc. The processor 32, 52, and/or 62 may be configured to analyze the collection 150 in view of the input received at stage 112 in order to select one or more of the sets 151-155 corresponding to the OOI indicated by the input. For example, referring also to FIG. 13, the processor 32 may be configured to cause the user interface 38 to display images 181, 182, 183, 184, 185 corresponding to the images in the image category 160 in each of the respective information sets 151-155. The processor 32, 52, and/or 62 may be configured to select a particular information set of the information sets 151-155 based on input from the user in response to the display of the images 181-185, e.g., the user touching one of the images 181-185, entering a number corresponding to one of the images 181-185, entering a desired location from which to take a photo (with an information set with a nearest location 162 being selected), etc. In this case, for the processor 52 or 62, the processor 52 or 62 may select the particular information set in response to an indication from the mobile device 12-16 of selection by the user through the user interface 38. As another example, the processor 32, 52, and/or 62 may be configured to select one of the information sets 151-155 based on a description of a desired image provided by the user, e.g., the user inputting a request for a grayscale photo with the Sphinx and a pyramid. In this example, the processor 32, 52, and/or 62 may select the image 182 and the corresponding information set 152, and may use a camera effect of grayscale even if the image in the information set 152 was taken in color. As another example, the processor 32, 52, and/or 62 may be configured to select one of the information sets 151-155 based on one or more criteria, with or without input from the user. For example, the processor 32, 52, and/or 62 may be configured to select one of the information sets 151-155 based on a present day of the year, a present time of day, ambient environmental conditions, etc., and the information in the various information sets 151-155 of the collection 150. While this discussion has focused on selection of one information set, more than one information set may be selected. Means for selecting the particular information set may be provided, for example, by the processor 32, the memory 34, and the user interface 38. As another example, means for selecting the particular information set may be provided by the processor 32, the memory 34, the user interface 38, the transceiver 40, the processor 52, the memory 54, and the transceiver 58. As another example, means for selecting the particular information set may be provided by the processor 32, the memory 34, the user interface 38, the transceiver 40, the processor 62, the memory 64, and the transceiver 68.

Figure 13:
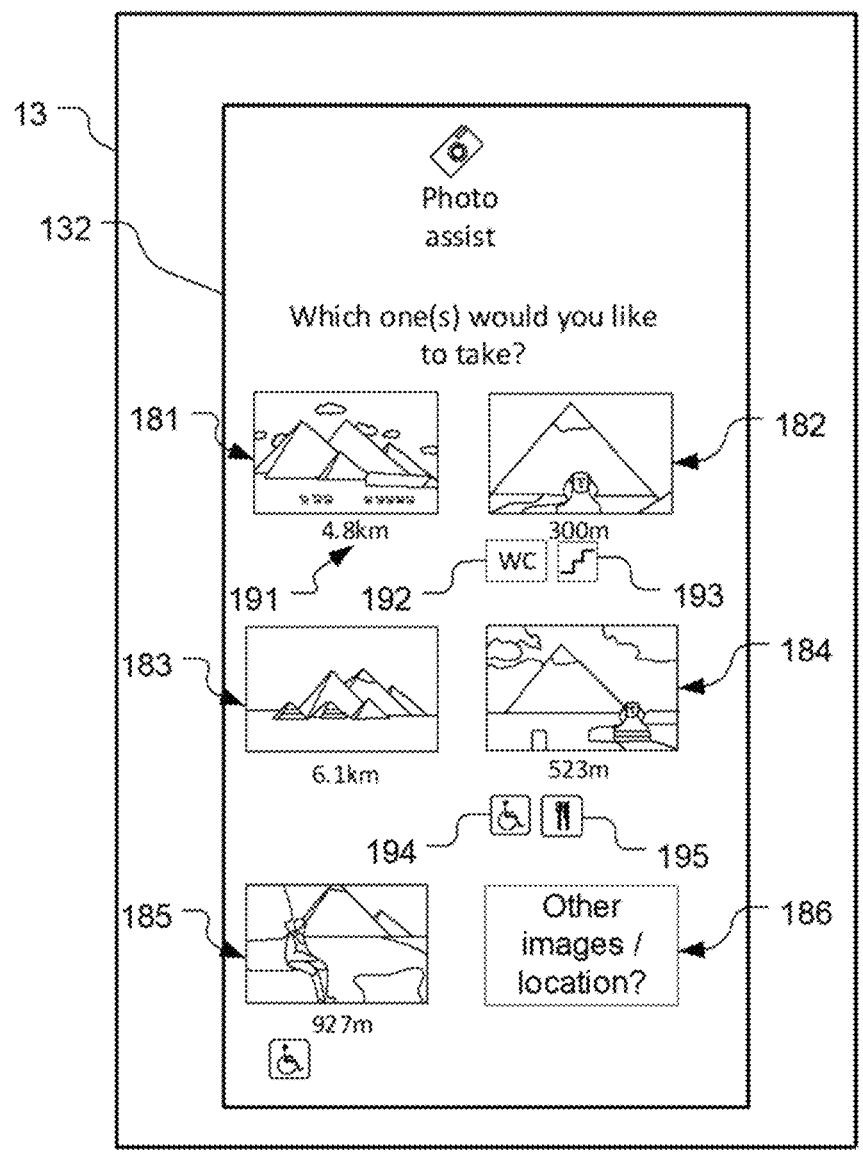
FIG. 13 is a simplified diagram of a user interface providing sample photos for recreation.

Information may be provided with respect to one or more of the displayed images 181-185. For example, as shown in FIG. 13, one or more appropriate indications may be displayed associated with (here adjacent to) one or more respective images to convey information, e.g., about the location for taking the corresponding image, about features at or near that locations, and/or about a route to that location, etc. Here, each image has a distance indication 191 to indicate a distance from a present location of the mobile device to the user location 162 for taking the corresponding image 181-185. A water closet icon 192 indicates the existence of a restroom (water closet WC) near the user location for the image. A stairs icon 193 indicates the existence of stairs in at least one route between the present location of the mobile device and the user location 162 for taking the corresponding image. A wheelchair icon 194 indicates that the user location for taking the corresponding image is wheelchair accessible. A utensils icon 195 indicates that food is available at the user location for taking the corresponding image. One or more other indications may be provided such as to indicate that the user location corresponding to an image (or one or more OOIs in the image) is or includes or is disposed near a landmark, a historic location, a family-friendly location, a park, a scenic viewpoint, a playground, a nature area (e.g., a preserve), etc.

The processor 32 may also cause the user interface 38 to display an other-images/location icon 186. The user may ignore the icon 186 if the user chooses one of the images 181-185. Alternatively, the user may select the icon 186 in order to see other images that the user may select in order to receive photographic guidance such as positional guidance, settings, etc.

Returning to FIG. 5, with further reference to FIGS. 1-4, and 6-13, at stage 118, the method 110 includes providing directional guidance through a user interface of the mobile device to direct a user of the mobile device to the particular location. The directional guidance may be visual and/or audible and/or tactile (e.g., the mobile device may vibrate to indicate which direction to go, or that the user took an incorrect turn, or that the user is heading in the wrong direction, or that the user is getting closer to the end location, etc.). The end location (where a photo is to be taken) may be determined from the selected information set from the collection 150, for example as the user location 162 from the selected information set 151-155. The directional guidance may be provided to the mobile device 12-16 from an entity (or entities) other than the mobile device 12-16, such as from the server 20, the base station 22, the base station 23, and/or the access point 24. The directional guidance may be provided by the mobile device 12-16 using the user location 162 as an input to the positioning system 44. The positioning system 44 may determine a route from a present location of the mobile device 12-16 to the user location 162 and provide directions to the user through the user interface 38. The directional guidance may be provided such that the user will arrive at the location at a desired time. Means for providing directional guidance may be provided, for example, by the processor 32, the memory 34, the user interface 38, and the positioning system 44. As another example, means for providing directional guidance may be provided by the processor 32, the memory 34, the user interface 38, the transceiver 40, the processor 52, the memory 54, and the transceiver 58. As another example, means for providing directional guidance may be provided by the processor 32, the memory 34, the user interface 38, the transceiver 40, the processor 62, the memory 64, and the transceiver 68.

Figure 14:
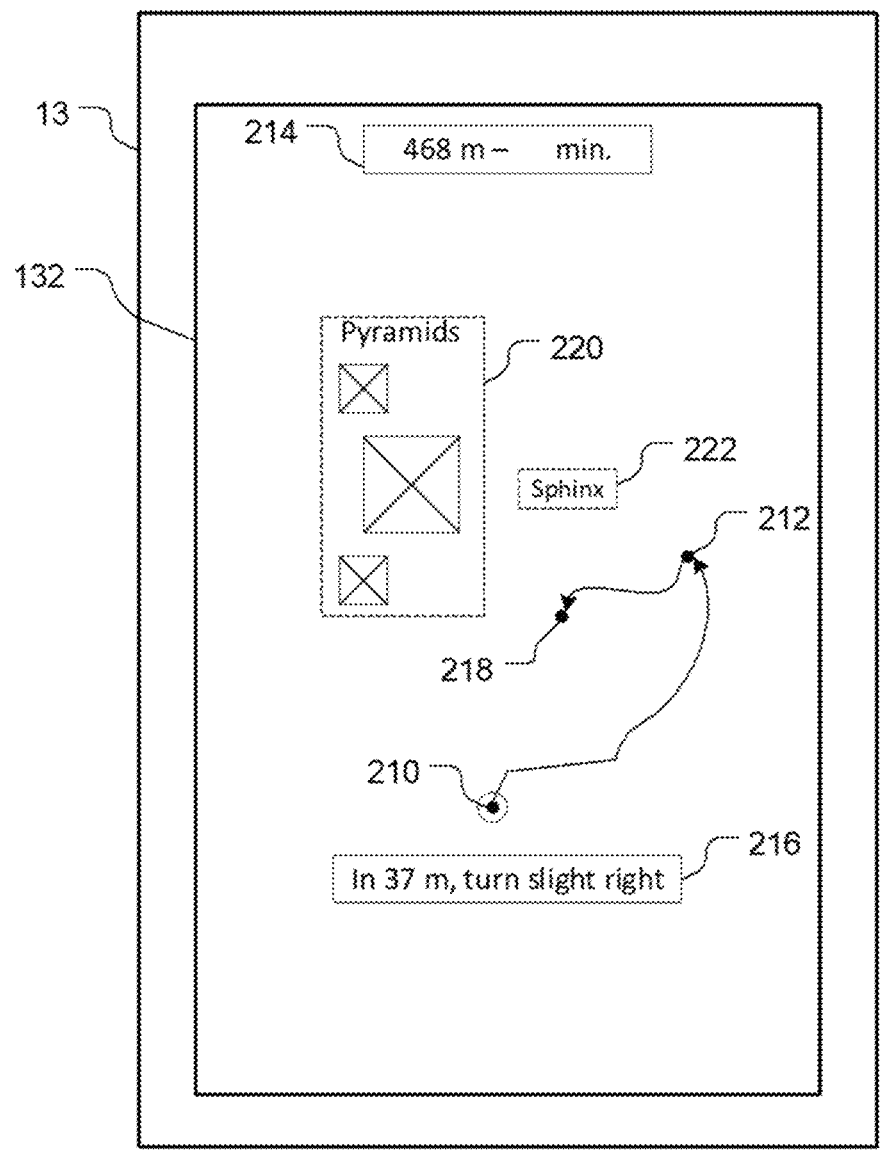
FIG. 14 is a simplified diagram of a user interface providing directional guidance to locations for taking photos.

Referring also to FIG. 14, the processor 32 may cause the display 132 of the mobile device 13 to display a top view of an area including a present location 210 of the user (i.e., of the mobile device 13), a destination location 212, a window 214 indicating an estimated distance and estimated time to the destination location 212, and a window 216 indicating a next change of direction and an estimated distance to that change of direction. The processor 32 may further cause the display 132 to show a further destination location 218 if more than one location for taking photographs was selected (e.g., multiple ones of the information sets 151-155 were selected). The processor 32 may further cause the display 132 to show one or more OOI's 220, 222 in the vicinity that may be the subject of desired photographs. Depending on the scale shown in the display 132 and the relative locations of the mobile device 13, the destination location(s) 212, 218, and the OOI(s) 220, 222, one or more of the destination location(s) 212, 218, and/or the OOI(s) 220, 222 may not be shown. The different destination locations 212, 218 may be for taking photographs of the same and/or different OOI's.

Also or alternatively, other forms of directional guidance may be provided to the user. For example, the processor 32 may cause the display 132 to indicate more or less information than as shown in FIG. 14. For example, the processor 32 may cause the display 132 to show an indication of direction that the user should take at the present time. When a turn is approaching, the display 132 may indicate an imminent turn and a direction, and at the time that the turn should be taken, the display 132 may show a different direction indication to prompt the user to make the turn. As another example, the processor 32 may cause the user interface 38 to provide visual and/or audible indications of whether the user is approaching, moving away from, or within a region corresponding to the destination location 212. For example, the processor 32 may cause the user interface 38 to play an intermittent tone where the frequency of the tone (i.e., how often the tone is played) is increased as the user approaches the destination location 212 and a positive-sounding sound, such as a chime, is played when the user reaches the destination location, e.g., is within a threshold distance (such as 2 m) of the latitude and longitude indicated by the user location 162.

Figure 15:
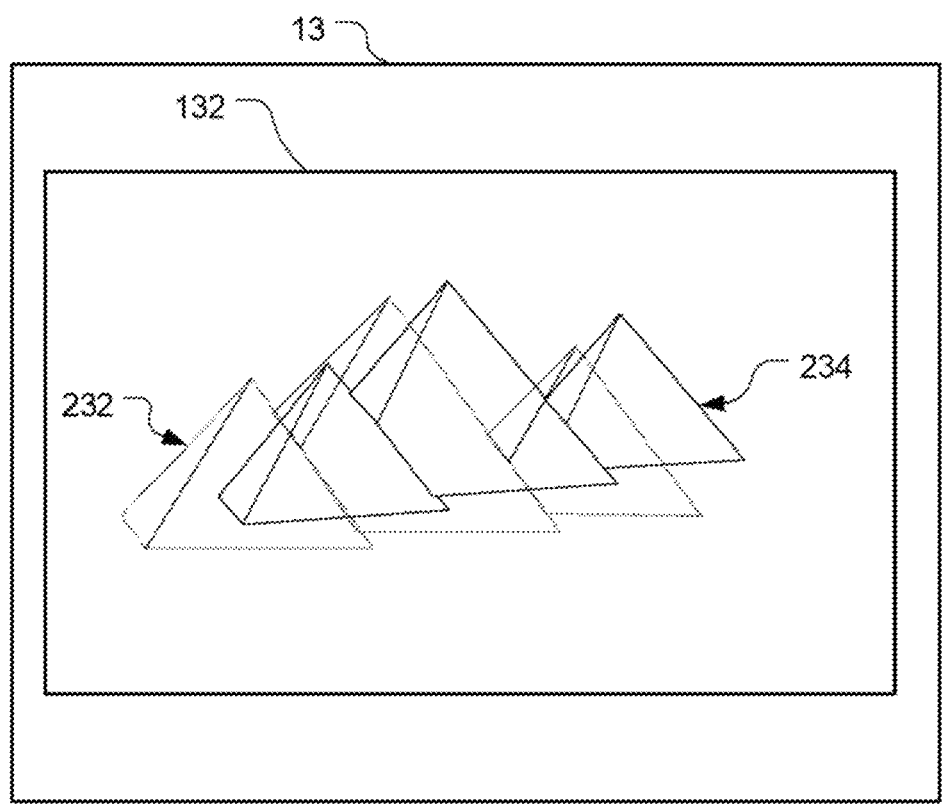
FIG. 15 is a simplified diagram of a transparent reference image displayed concurrently with an image to be captured by a camera shown in FIG. 2.

Still other forms of directional guidance may be provided. The directional guidance may include orientation guidance, e.g., when the user is close to or at the user location for taking the desired image. For example, the processor 32 may cause the display 132 to give visual feedback to the user as the user changes the orientation of the camera 42 (e.g., the orientation of the mobile device). The visual feedback may, for example, comprise one or more arrows indicating suggested changes in roll, pitch, and/or yaw. The orientation guidance may include audio feedback to help the user achieve an orientation indicated by the information set 151-155 of a selected image 160. Also or alternatively, tactile feedback may be provided to help guide the user to an orientation indicated by a selected information set. Visual guidance for location and/or orientation of the camera 42 may include displaying the selected image 160 transparently such that the display 132 concurrently shows both the image 160 and a present image-to-be-captured of the camera 42. For example, as shown in FIG. 15, a transparent image 232 may be displayed concurrently with an image-to-be-captured 234 (the present field of view of the camera 42). The user may alter the orientation of the camera 42 and/or characteristics of the camera 42 (e.g., here camera zoom (focal length)) such that the image-to-be-captured 234 and the selected image 160 (as indicated by the image 232) have a desired relationship (e.g., match or have a desired non-matching relationship).

Directional guidance may include guidance to multiple locations and/or may provide guidance for planning a trip. For example, guidance may be provided for going to the destination location 212, and then directions may be provided to guide the user from the destination location 212 to the destination location 218. The guidance may consider multiple factors such as difficulty of route, different modes of transportation in order to get to the destinations, congestion that one or more of the locations, congestion of the routes to the locations, congestion of other possible routes to the locations, etc. Based on one or more of these factors, the guidance may determine a suggested sequence for the user to visit the locations 212, 218 (or more locations). The guidance may suggest different possible forms of transportation such as car, public transportation, walking, bicycling, etc. The guidance may be provided to help the user plan a vacation, e.g., days, weeks, months, or even years in advance, and may provide guidance related to different travel times to destination locations depending on selected times of day, days of the week, months of the year, etc. Further, depending on the day(s) of the year selected by a user for a trip, the user may be presented (e.g., at stage 116) with different possible images for photographs to be taken based on lighting at the various times of the year.

Directional guidance may take one or more factors into account, and one or more of these factors may be entered by the user and/or determined by the processor 32. For example, the directional guidance may consider a form of transportation (e.g., car, public transportation, walking, etc.) that the user has selected to use or to avoid, and/or one or more limitations the user has selected (e.g., avoid tolls, need wheelchair access, etc.), etc. The processor 32 may determine characteristics of various alternative routes (e.g., existence of stairs, total distance, altitude gain/loss, expected travel time, etc.) to provide one or more suggested routes and corresponding directional guidance to the user and/or to the subject.

Figure 16:
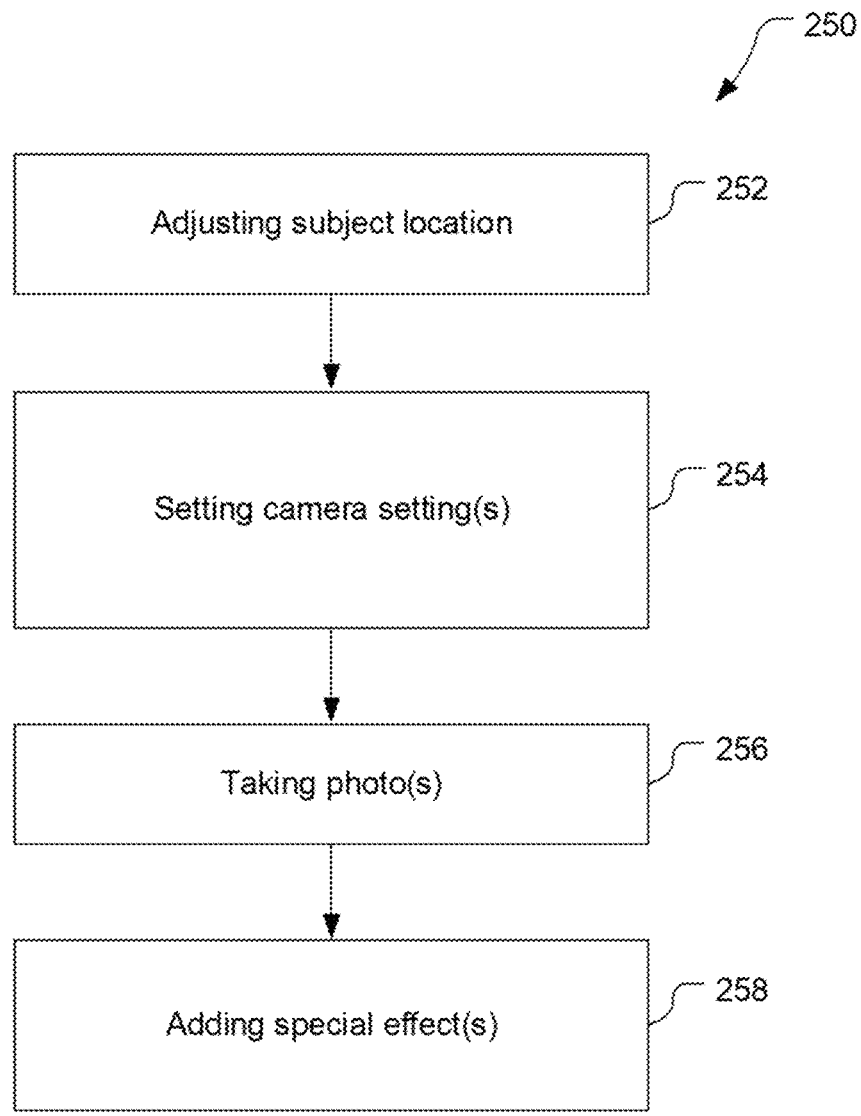
FIG. 16 is a block flow diagram of a method of assisting photography.

Referring to FIG. 16, with further reference to FIGS. 1-15, a method 250 of assisting photography includes the stages shown. The method 250 is, however, an example only and not limiting. The method 250 may be altered, e.g., by having stages added, removed, rearranged, combined, performed concurrently, and/or having single stages split into multiple stages. The method 250 may be performed independently of the method 110, and one or more stages of the method 250 may be performed in addition to the method 110. For example, stages 252, 254 discussed below may be performed after stage 116 of the method 110 and before stage 118 of the method 110. As another example, stage 118 of the method 110 may be performed interspersed with stage 256 and/or stage 258. As another example, stage 254 may be performed after stage 118, e.g., after presenting the user with images and/or other information from which the user may select in order to set one or more of the settings of the camera 42.

Figure 17:
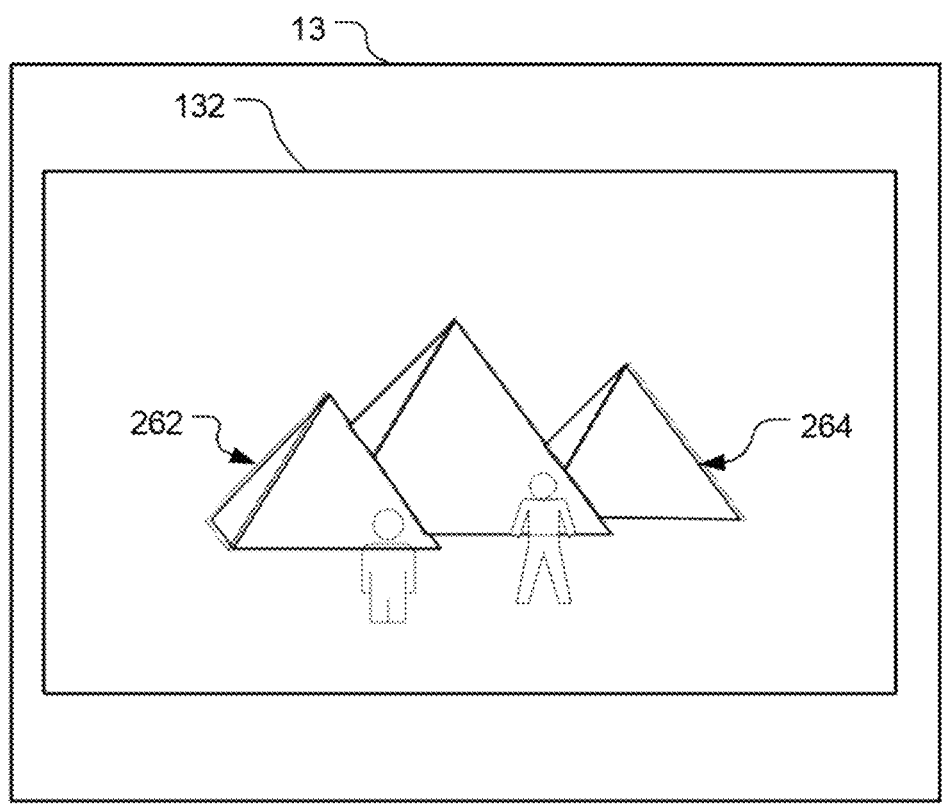
FIG. 17 is a simplified diagram of a transparent reference image displayed concurrently with an image to be captured by the camera shown in FIG. 2.

At stage 252, the method 250 includes adjusting subject location. For example, the processor 32 (or the processor 52 and/or the processor 62) may analyze the image 160 to be replicated and determine a location for a foreground subject such as a person (or persons) with the OOI(s) to be a background object in the photo. For example, the processor 32 and the user interface 38, or the processor 32 and the transceiver 40, may provide means for providing subject directional input. The processor 32 may provide subject directional input through the user interface 38 to the user for instructing the subject as to where to stand, sit, etc. for the photo. Also or alternatively, the processor 32 may establish a communication link via the transceiver 40 to (pair with) a mobile device associated with the subject and provide subject directional input to that mobile device for providing guidance through the user interface of the subject's mobile device to the subject for positioning in the photo. The communication link may be direct, e.g., a peer-to-peer connection such as a BLUETOOTH® connection, or indirect, e.g., through one or more base stations, and/or one or more access points, and/or one or more networks. Thus, the directional input may be provided to the subject's mobile device directly or indirectly from the user's mobile device, e.g., the mobile device 12. The directional input may include directional guidance (e.g., a map, and/or instructions such as "move north 10 meters," and/or audible and/or visual feedback to direct the subject's movement, etc.) and/or a destination location for the subject (e.g., with the subject's mobile device providing directional guidance (e.g., a map) based on the destination location and a present location of the subject's mobile device). The input provided to the subject may be provided by another entity (or entities) such as a base station, an access point, etc., possibly under the control of another entity (or entities) such as the server 20. The input to the subject may include location and/or orientation of the subject, e.g., which direction for the subject(s) to face. Thus, for example, the user's mobile device may pair with the subject's mobile device (e.g., using BLUETOOTH® or other wireless communication technology) to provide information (e.g., directional guidance, orientation guidance, etc.) to the subject via the subject's mobile device. The user's mobile device may pair (or at least initiate pairing), or prompt the user as to whether the device should pair, with another mobile device in response to the user selecting an image containing a subject, e.g., in addition to an OOI. For example, the subject may be directed to stand in a certain location and assume a certain pose in order to achieve a desired photograph, for example, a funny photograph such as a person appearing to touch the top of one of the great pyramids. The subject could be given guidance in real-time while the user is attempting to take the photograph such that the subject is guided until an appropriate pose is reached, at which time the processor 32 may indicate to the subject to stay still and/or the processor 32 may cause the camera 42 to capture one or more images. To help with subject location and/or orientation, the processor 32 may cause the display 132 to provide visual guidance. This visual guidance may include displaying the selected image 160 transparently such that the display 132 shows both the image 160 and a present image-to-be-captured of the camera 42. For example, as shown in FIG. 17, a transparent image 262 may be displayed concurrently with an image-to-be-captured 264 (the present field of view of the camera 42). The user and/or the processor 32 may determine difference in location and/or orientation of the subject in the two images and may provide instructions to the subject (or the subject's mobile device) to alter the location and/or the orientation of the subject such that the image-to-be-captured and the selected image 160 have a desired relationship (e.g., match or have a desired non-matching relationship).

At stage 254, the method 250 includes setting one or more camera settings. The camera settings may be based on the OOI (e.g., the background of a photo), the subject (e.g., the foreground of the photo), and/or the user (e.g., the user's desired photo content, angle, perspective, magnification, effects, etc., e.g., as reflected in the selected information set). For example, the processor 32 may analyze the selected information set, e.g., the information set 151, and automatically set the camera settings according to the values in the camera settings 164 of the corresponding information set 151, which may help ensure a quality picture and/or a picture resembling a selected/desired picture. If no camera settings are available in the selected information set, then default settings (e.g., auto-focus settings) may be used, or settings may be deduced, e.g., by analysis of the image 160 in the selected information set. The processor 32 may override present settings of the camera 42, may override auto-focus settings that the camera 42 would otherwise use, and/or user-selected settings. The automatic settings set by the processor 32, however, may be overridden, e.g., by the user before or after one or more photos are taken. The camera settings set by the processor 32 may be those found in the camera settings 164 of the corresponding information set, in this example the information set 151, or may be different settings that are based on the settings found in the information set 151. For example, the processor 32 may adjust the settings in the information set 151 based on the present time of day, present day of year, and/or present ambient conditions, etc. and the camera settings 164 and/or other information (e.g., time of day, day of year, etc.) associated with the image 160 in the selected information set 151. Also or alternatively, the camera settings 164 may be adjusted from the stored settings based on one or more characteristics of the camera 42 of the mobile device 13 and/or one or more characteristics of the camera that captured the image 160 of the selected information set 151. Settings for the camera 42 may be received dynamically, e.g., via the access point 24 and/or the base station 22 (and possibly stored in the memory 34) and/or may be stored previously and retrieved from the memory 34. Setting the camera settings may include applying one or more filters to the prospective image.

Figure 18:
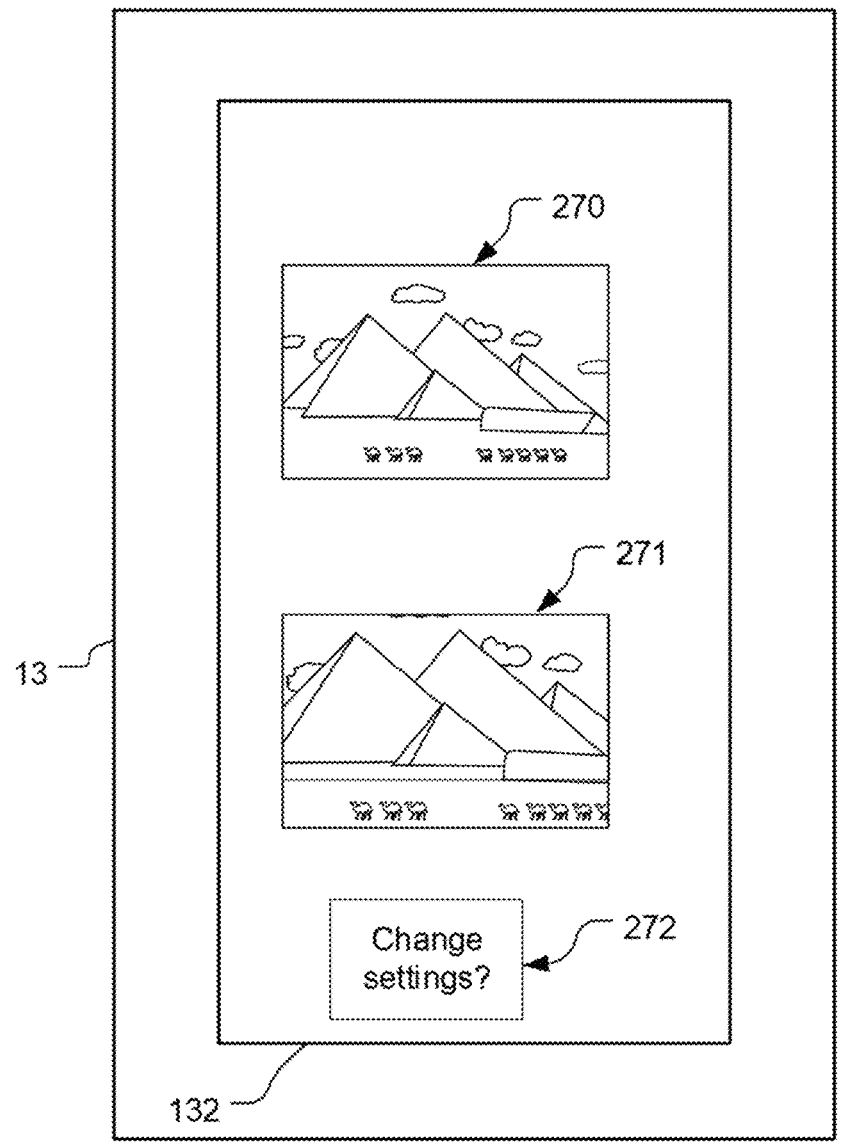
FIG. 18 is a simplified diagram of a user interface providing a preview of a photo with automatically-set camera settings.

Referring also to FIG. 18, the user may be provided with an image 270 to be captured while the user is using the camera application of the mobile device 13. The image 270 shows a preview of the photograph as the photograph will appear once the photograph is taken, with all of the present settings and/or filters being applied. The processor 32 may be configured to cause the display 132 to show a change-settings icon 272 asking the user whether the user wishes to change any of day settings, which may include any filters. The user may capture an image with the present settings and determine whether the captured image should be kept or deleted, and/or retaken. The processor 32 may be configured to allow the user to change one or more of the settings, possibly including one or more filters, in response to the user selecting (e.g., touching the display 132 over) the change-settings icon 272. The processor 32 may be configured to use the selected image 160 from the selected information set 151 to determine a desired OOI, and may use this to focus on the desired OOI in the presence of extraneous objects, such as persons other than the subject being in the field view of the camera 42. For example, the processor 32 may adjust the focus and/or depth effect in order to concentrate on the OOI, and possibly the subject, while helping to ignore (e.g., blur) one or more objects that are not the OOI(s) or the subject. As another example, the processor 32 may adjust the camera 42 for picture-in-picture based on the desired OOI(s) and/or the subject.

The user may be presented with images with different settings for pictures corresponding to the present location of the user. For example, if the user (and possibly the subject) has been directed to a location corresponding to entered information, e.g., according to information selected at stage 116 and after receiving directions at stage 118 discussed above, the user may be presented with multiple images of a selected OOI but with different settings for each of the images. For example, in addition to the user being presented with the image 270 (e.g., the processor 32 causing the user interface 38 to display the image 270), the user may be presented with an image 271 that corresponds to the camera 42 having a different zoom setting than for the image 270. The user may select the image that the user would like to take, e.g., that has a desired appearance, and in response to this selection, the processor 32 may adjust one or more of the settings of the camera 42 as appropriate (e.g., changing a filter, and/or changing a zoom level, etc.)

Adjusting the settings of the camera 42 based on information from the collection 150 may help capture images in a variety of situations. For example, an image in front of a monument with a crowd walking within the field of view of the camera 42 may be improved by focusing on the OOI while ignoring the crowd. Adjustments to the zoom in such a situation may help improve the image as well. As another example, the sunset that appears on a popular beach may be better captured using techniques discussed herein by having the processor 32 automatically adjust settings of the camera 42 based on information from previously-captured images in addition to or instead of auto-focus settings. As another example, a waterfall OOI may be better captured by using slow-motion video capture and focusing on the running water, knowing the water is an OOI. Limitless other examples are possible.

Returning to FIG. 16, with further reference to FIGS. 1-15, at stage 256, the method 250 includes taking one or more photos. For example, the processor 32 may cause the camera 42 to take multiple photos as part of an auto-burst mode. The processor 32 may be configured to cause the camera 42 to use the same settings for these photos and/or may be configured to cause the camera 42 to use multiple different settings for different ones of these photos. The captured photos with the one or more configurations of settings may be shown to the user and the user may select desired ones of the photos to keep or delete, and/or retake. The processor 32, the processor 52, and/or the processor 62 may provide positioning guidance (e.g., see stage 118 discussed above) before and/or after one or more photos are taken. For example, the user may be given guidance to move forward or backward and/or to change an orientation of the camera 42 to adjust the image(s) to be captured, e.g., before an image is captured or after an image is captured.

At stage 254, the method 250 includes adding one or more special effects. The effects may include allowing a user to add visual effects (e.g., animated/cartoon objects) to the image captured, to distort objects within the image captured, and/or to apply coloring effects, etc., and/or audible effects such as commentary, sound effects, etc. Some coloring effects include grayscale images and sepia images, although these may be part of the camera settings instead of an effect added to a captured image.

Other Considerations

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

The invention claimed is:

1. A method for providing photography assistance, the method comprising:
   presenting one or more icons on a mobile device regarding one or more object of interest (OOI) in response to detecting that the mobile device is within a threshold distance of a base station or an access point;
   obtaining a set of photographs associated with the one or more OOI;
   presenting the set of photographs associated with the one or more OOI on a display of the mobile device; and
   in response to a selection of at least one photograph from the list of photographs, providing directional guidance via one or more user interface of the mobile device, wherein the directional guidance includes directions to reach a particular location associated with the selected at least one photograph.

2. The method of claim 1 further comprising:
   providing additional assistance based on information associated with the selected at least one photograph, wherein the additional assistance comprises (a) suggested camera settings for taking photos, (b) suggested timing for taking photos, or combinations thereof.

3. The method of claim 1 wherein determining the one or more OOI further comprises:
   determining the one or more OOI based at least in part on one or more images captured by the mobile device.

4. The method of claim 1 wherein determining the one or more OOI further comprises:
   determining the one or more OOI based at least n part on input received via the one or more user interface.

5. The method of claim 1 wherein the one or more OOI is determined by the mobile device.

6. The method of claim 1 wherein the one or more 1 is determined by a server, a base station, an access point, or combinations thereof.

7. The method of claim 6 further comprising:
   providing, by the mobile device, the location of the mobile device to the server, the base station, the access point, or combinations thereof and wherein the one or more OOI is determined by the server, the base station, the access point, or combinations thereof based on a threshold distance with respect to the location of the mobile device.

8. The method of claim 1 wherein the set of photographs are selected based on popularity of the photographs, proximity to the location of the mobile device, accessibility of the locations associated with the images, weather conditions, input received via a user interface, or any combinations thereof.

9. An apparatus of a mobile device for providing photography assistance, the apparatus comprising:
   means for presenting one or more icons on the mobile device regarding one or more object of interest (OOI) in response to detecting that the mobile device is within a threshold distance of a base station or an access point;
   means for obtaining a set of photographs associated with the one or more OOI;
   means for presenting the set of photographs associated with the one or more OOI on a display of the mobile device; and
   means for providing directional guidance via one or more user interface the mobile device in response to a selection of at least one photograph from the list of photographs, wherein the directional guidance includes directions to reach a particular location associated with the selected at least one photograph.

10. The apparatus of claim 9 further comprising:
    means for providing additional assistance based on information associated with the selected at least one photograph, wherein the additional assistance comprises (a) suggested camera settings for taking photos, (b) suggested timing for taking photos, or combinations thereof.

11. The apparatus of claim 9 wherein means for determining the one or more OOI further comprises: means for determining the one or more OOI based at least in part on one or more images captured by the apparatus.

12. The apparatus of claim 9 wherein means for determining the one or more OOI further comprises:
    means for determining the one or more OOI based at least in part on input received from one or more user interface of the apparatus.

13. The apparatus of claim 9 wherein the one or more OOI is determined by the apparatus.

14. The apparatus of claim 9 wherein the one or more OOI is determined by a server, a base station, an access point, or combinations thereof.

15. The apparatus of claim 14 further comprising:
    means for providing the location of the mobile device to the server, the base station, the access point, or combinations thereof and wherein the one or more OOI is determined by the server, the base station, the access point, or combinations thereof based on a threshold distance with respect to the location of the mobile device.

16. The apparatus of claim 9 wherein the set of photographs are selected based on popularity of the photographs, proximity to the location of the mobile device, accessibility of the locations associated with the photographs, weather conditions, input received via a user interface, or any combinations thereof.

17. A mobile device comprising:
    a memory;
    one or more transceivers;
    at least one processor coupled to the memory and the one or more transceivers, the at least one processor configured to:
    present one or more icons on the mobile device regarding one or more object of interest (OOI) in response to detecting that the mobile device is within a threshold distance of a base station or an access point;
    obtain a set of photographs associated with the one or more OOI;
    present the set of photographs associated with the one or more OOI on a display of the mobile device; and
    in response to a selection of at least one photograph from the list of photographs, provide directional guidance via one or more user interface of the mobile device, wherein the directional guidance includes directions to reach a particular location associated with the selected at least one photograph.

18. The mobile device of claim 17 wherein the at least one processor is further configured to:
provide additional assistance based on information associated with the selected at least one photograph, wherein the additional assistance comprises (a) suggested camera settings for taking photos, (b) suggested timing for taking photos, or combinations thereof.

19. The mobile device of claim 17 wherein the at least one processor is further configured to determine the one or more OOI based at least in part on one or more images captured by the mobile device.

20. The mobile device of claim 17 wherein the at least one processor is further configured to determine the one or more OOI based at least in part on input received via the one or more user interface.

21. The mobile device of claim 17 wherein the one or more OOI is determined by the mobile device.

22. The mobile device of claim 17 wherein the one or more OOI is determined by a server, a base station, an access point, or combinations thereof.

23. The mobile device of claim 17 wherein the at least one processor is further configured to:
provide the location of the mobile device to the server, the base station, the access point, or combinations thereof and wherein the one or more OOI is determined by the server, the base station, the access point, or combinations thereof based on a threshold distance with respect to the location of the mobile device.

24. The mobile device of claim 17 wherein the set of photographs are selected based on popularity of the photographs, proximity to the location of the mobile device, accessibility of the locations associated with the images, weather conditions, input received via a user interface, or any combinations thereof.

25. A non-transitory, processor-readable storage medium storing processor-readable instructions that, when executed by one or more processors, cause the one or more processors to perform operations comprising:
presenting one or more icons on a mobile device regarding one or more object of interest (OOI) in response to detecting that the mobile device is within a threshold distance of a base station or an access point;
obtaining a set of photographs associated with the one or more OOI;
presenting the set of photographs associated with the one or more OOI on a display of the mobile device; and
in response to a selection of at least one photograph from the list of photographs, providing directional guidance via one or more user interface of the mobile device, wherein the directional guidance includes directions to reach a particular location associated with the selected at least one photograph.

26. The non-transitory, processor-readable storage medium of claim 25 wherein the operations further comprise:
providing additional assistance based on information associated with the selected at least one photograph, wherein the additional assistance comprises (a) suggested camera settings for taking photos, (b) suggested timing for taking photos, or combinations thereof.

27. The non-transitory, processor-readable storage medium of claim 25 wherein the set of photographs are selected based on popularity of the photographs, proximity to the location of the mobile device, accessibility of the locations associated with the images, weather conditions, input received via a user interface, or any combinations thereof.

* * * * *